2,940,970

ISONICOTINYL HYDRAZIDE DERIVATIVES

Arthur Adams, Upminster, and Ronald Slack, London, England, assignors to May & Baker Limited, Dagenham, Essex, England, a British company No Drawing. Filed Dec. 19, 1958, Ser. No. 781,448

Claims priority, application Great Britain Jan. 17, 1958

1 Claim. (Cl. 260—240)

This invention relates to a new derivative of isonicotinylhydrazide, to a process for its preparation and to pharmaceutical compositions containing the same.

It is known that isonicotinylhydrazide possesses antibacterial properties and is particularly useful in the treatment of tuberculosis.

As the result of research and experimentation, it has now been found that the hitherto unknown isonicotinylhydrazide derivative of the formula:

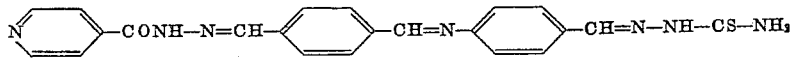

viz. 4' - formylbenzal - 4 - thiosemicarbazonoformylaniline pyridine-4-carboxyhydrazone, possesses valuable antibacterial properties.

As a therapeutic agent for use in the treatment of tuberculosis the compound of the present invention exhibits a number of important advantages. It is a discrete monomeric substance with a fixed known content of isonicotinylhydrazide and p-aminobenzaldehyde thiosemicarbazone; in vitro tests have shown it to possess a similar activity to p-acetamidobenzaldehyde thiosemicarbazone while in vivo tests have demonstrated its high degree of activity against strains of *Mycobacterium tuberculosis* (such as strain Ba) resistant to isonicotinylhydrazide.

According to a feature of the invention, the aforesaid new compound may be prepared by condensing 4'-formylbenzal-4-thiosemicarbazonoformylaniline with pyridine-4-carboxyhydrazide. The 4' - formylbenzal-4-thiosemicarbazonoformylaniline is obtained by condensing p-aminobenzaldehyde thiosemicarbazone with terephthalaldehyde in a suitable solvent and may be employed in the form of the solution in which it is formed.

The production of the new compound is illustrated by the following example.

Example I

A solution of p-aminobenzaldehyde thiosemicarbazone (12.95 g.) in dimethylformamide (67 cc.) was stirred into an ice-cooled solution of terephthaldehyde (8.95 g.) in dimethylformamide (67 cc.), and the mixture was set aside overnight. The resulting solution of 4'-formylbenzal-4-thiosemicarbazonoformylaniline [which may be isolated by precipitation with water, and recrystallized from ethanol to give yellow crystals, M.P. >360° C.] was treated with a cold solution of pyridine-4-carboxyhydrazide (9.1 g.) in dimethylformamide (200 cc.) and the mixture was set aside overnight. The crystalline precipitate of terephthalaldehyde bis-pyridine-4-carboxyhydrazone was filtered off [4.1 g., which, after boiling with ethanol, forms colourless crystals, M.P. 357–358° C.], and the filtrate treated with water until the mixture became cloudy (ca. 1 l.). After several hours the yellow crystalline 4'-formylbenzal-4-thiosemicarbazonoformylaniline pyridine - 4 - carboxyhydrazone monohydrate was filtered off, and the filtrate was treated with a further litre of water to give a further crop. The combined products were washed with ethanol, and boiled with ethanol (500 cc.) for one hour to remove any remaining impurities. The insoluble product was collected, washed with fresh ethanol, and dried. Yield, 16.3 g., M.P. >300° C. (decomp.).

The invention includes within its scope pharmaceutical preparations containing the aforesaid new substance for use in the treatment of tuberculosis in which the active material is dispersed in a pharmaceutical carrier which may be either a solid material or a liquid. In clinical practice the substance will be administered orally. Preparations for oral ingestion can be liquids or solids or any combination of these forms, such as suspensions, syrups, elixirs, emulsions, powders or tablets. Pharmaceutical preparations for administration of the active therapeutic agent in unit dose form can take the form of compressed powders (or tablets) or of a powder enclosed in a suitable capsule of absorbable material such as gelatin. These compressed powders (or tablets) can take the form of the active materials admixed with suitable excipients and/or diluents such as starch, lactose, stearic acid, magnesium stearate or dextrin.

In yet a further embodiment, the active material may, as such or in the form of a diluted composition, be put up in powder packets and employed as such.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 50% by weight of active substance in the case of solid preparations, e.g. tablets, and at least 5% by weight of such substance in the case of liquid preparations, e.g. suspensions.

The preparation of typical pharmaceutical preparations according to the present invention is illustrated by the following examples.

Example II

Tablets of the formula:

| | Mg. |
|---|---|
| 4' - formylbenzal - 4-thiosemicarbazonoformylaniline pyridine-4-carboxyhydrazone | 500 |
| Potato starch | 50 |
| Dextrin | 50 |
| Acacia | 5 |
| Magnesium stearate | 5 | were prepared by intimately mixing the said pyridine-4-carboxyhydrazone, starch, dextrin and acacia. The mixture was moistened with water and the resulting mass converted into granules by passing through a sieve of suitable size. The granules were dried at 60° C., passed through a sieve of suitable size and the resulting granules mixed with the magnesium stearate. The granules were then compressed into tablets.

Example III

An aqueous suspension having the following percentage composition by weight:

| | Percent |
|---|---|
| 4' - formylbenzal - 4-thiosemicarbazonoformylaniline pyridine-4-carboxyhydrazone | 14.0 |
| Sucrose | 65.0 |
| Methyl hydroxybenzoate | 0.15 |
| Flavouring | 0.2 |
| Colouring | 0.1 |
| Water up to 100%. | | was prepared by dissolving the methyl hydroxybenzoate in water and adding the sucrose. The resulting solution was filtered and the said pyridine-4-carboxyhydrazone in a finely divided state added with stirring to the filtrate. The stirring was continued until the said pyridine-4-carboxyhydrazone was thoroughly suspended. The mixture was then cooled and the flavouring and colouring added.

We claim:

The compound 4'-formylbenzal-4-thiosemicarbazono-formylaniline pyridine-4-carboxyhydrazone of the structural formula:

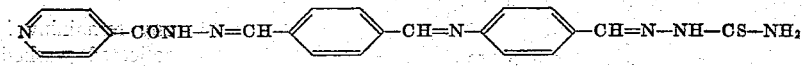

References Cited in the file of this patent

FOREIGN PATENTS

| | | |
|---|---|---|
| 910,648 | Germany | May 3, 1954 |
| 927,505 | Germany | May 9, 1955 |
| 309,720 | Switzerland | Nov. 16, 1955 |